March 28, 1961 A. R. BUCHHOLZ 2,976,874
COIN CHANGER APPARATUS
Filed Oct. 30, 1957 10 Sheets-Sheet 1

Fig. 1

INVENTOR.
Arnold R. Buchholz
BY
Quarles & French
Attys.

INVENTOR.
Arnold R. Buchholz
BY Juarles & French
Attys.

March 28, 1961 A. R. BUCHHOLZ 2,976,874
COIN CHANGER APPARATUS
Filed Oct. 30, 1957 10 Sheets-Sheet 7

INVENTOR.
Arnold R. Buchholz
BY
Quarles & French
Att'ys.

United States Patent Office 2,976,874
Patented Mar. 28, 1961

2,976,874

COIN CHANGER APPARATUS

Arnold R. Buchholz, Watertown, Wis., assignor to Brandt Automatic Cashier Company, Watertown, Wis., a corporation of Wisconsin Filed Oct. 30, 1957, Ser. No. 693,327

4 Claims. (Cl. 133—2)

The invention relates to coin changers.

One object of the invention is to provide, in an electrically operated coin changer machine having certain features in common with my prior copending application Serial No. 581,581, filed April 30, 1956, now abandoned, showing a coin payer machine, other features to meet the particular demands of a coin changer such as special keys and their associated mechanisms to permit the use of a standard keyboard operating on a dollar tender basis to operate on the basis of any tender less than a dollar.

A further object of the invention is to provide, in an electrically operated coin changer machine of the type described operable on the basis of any tender, mechanism that permits of the use of a single nickel channel or stack and its ejector which does what would ordinarily be the work of three nickel channels and their ejectors, thus keeping the width or size of the machine down to limits used in the usual dollar tender machines.

The invention further consists in the several features hereinafter set forth and more particularly defined by claims at the conclusion hereof.

Referring to Figs. 1 to 4, the machine includes a metal housing having a base 1, sides 2, and back 3. A coin tray 4 is suitably removably mounted at the front end of the housing and is formed to provide coin compartments or channels for the various denominations of coins to be handled. The channels A, B, and C carry pennies, the channel D carries nickels, the channels E and F dimes, the channel G quarters, and the channel H half dollars. The ejector mechanism for channel A is adapted to eject one penny at a time therefrom, and the ejector mechanisms for channels B and C are adapted to eject two pennies each at a time, so that either one penny, two pennies, three pennies, four pennies, or five pennies can be dispensed from the machine as needed for change. The ejector mechanism for channels E and F are each adapted to eject one dime at a time while the ejectors for channels D, G, and H are adapted to eject one coin at a time from their associated channels.

Figure 1:
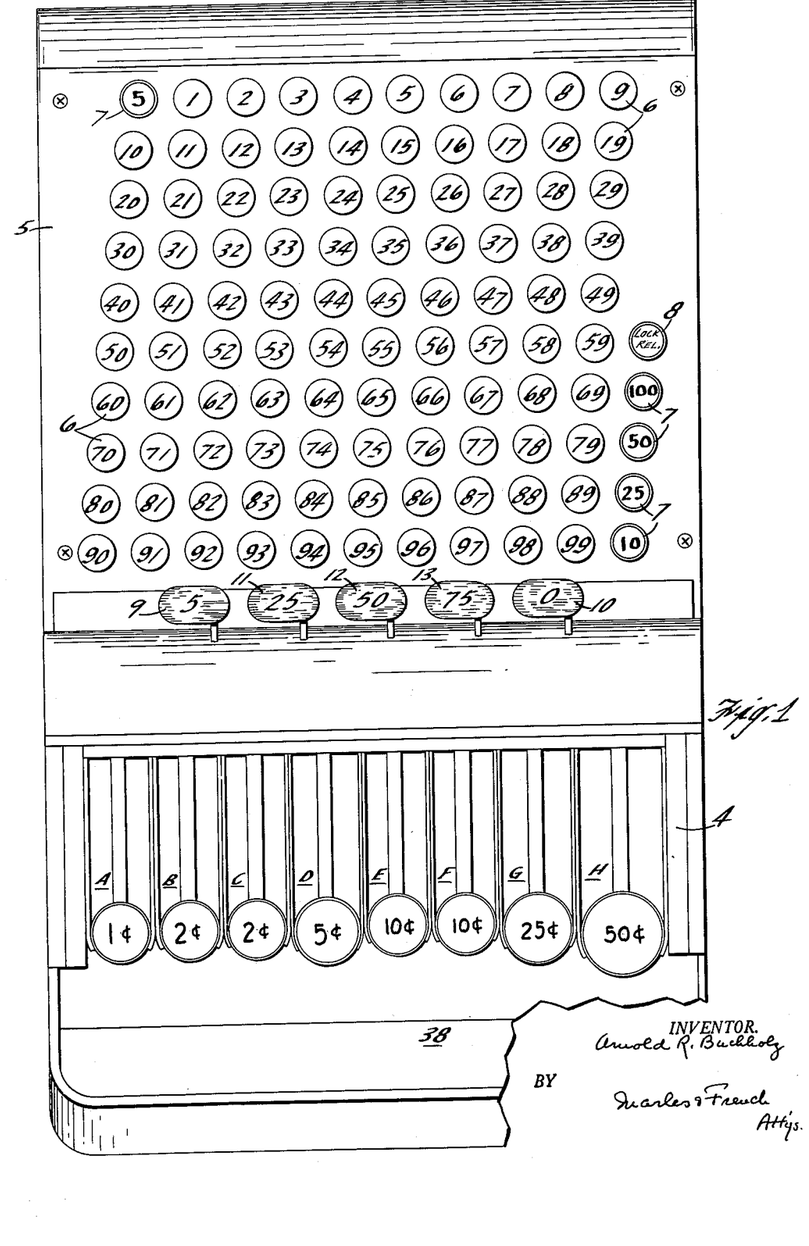
Fig. 1 is a top plan view of a coin changer machine embodying the invention.
Figure 2:
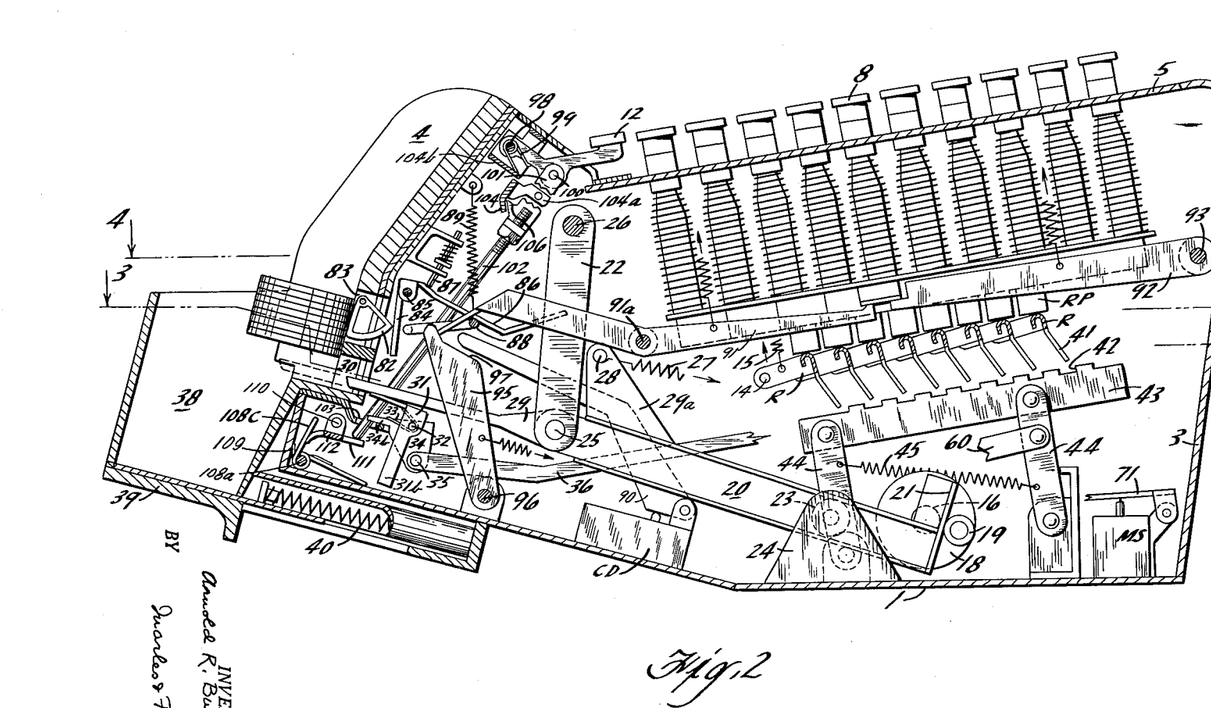
Fig. 2 is a vertical sectional view taken on the line 2—2 of Fig. 4, parts being broken away.

Referring to Fig. 1, a keyboard 5 is mounted on the top of the housing in back of the tray and carries change keys 6 numbered 1 to 99 which while indicated as purchase amounts actually represent the difference between the purchase price and a dollar, and also has special payer keys 7 for 5, 10, 25, 50, and one dollar and a lock release key 8. In addition, where the mount of tender is less than a dollar, special keys 9, 10 are provided which take care of operating the machine to give change for a purchase amount ending in five or zero, that is, five cents or ten cents or any multiple of these not including 25, 50, and 75 cents, which last named amounts of tender are taken care of respectively by the special keys 11, 12, and 13. The keys 6 are known construction and are spring operated, as indicated in Fig. 2, to a release position, and their details may be found in the following prior U.S. patents: Brandt No. 1,850,198, dated March 22, 1932, and Brandt No. 1,822,560, dated September 8, 1921. The keys 6 are designed to provide one or more projections RP, each of which is disposed over a rocker R. Each rocker R is pivotally mounted on pins 14 (see Figs. 2 and 3) mounted in the sides 2 of the machine and held against or in operative association with its associated key by a spring 15 (see Fig. 2).

Figure 4:
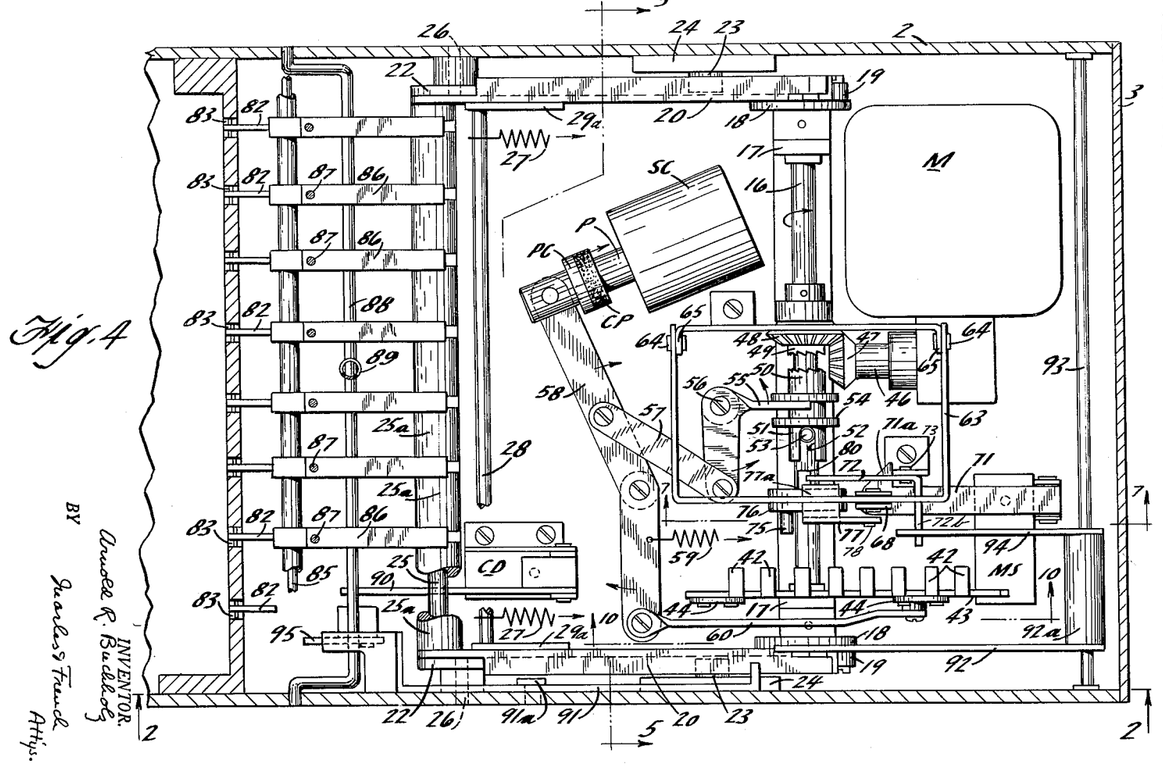
Fig. 4 is a horizontal sectional view taken on the broken line 4—4 of Fig. 2.
Figure 5:
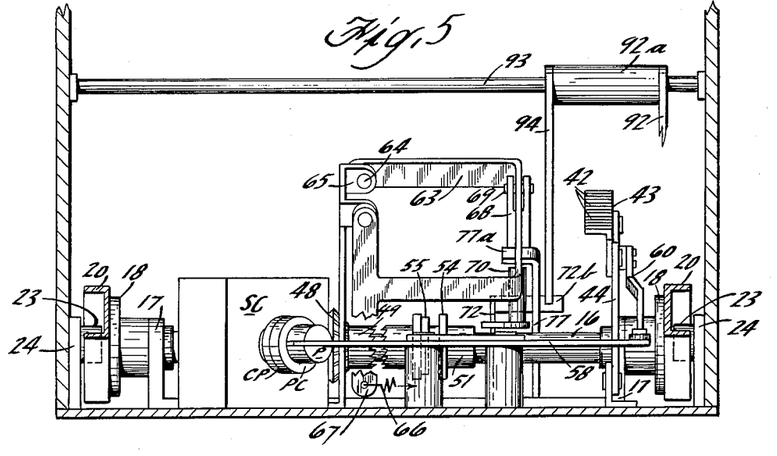
Fig. 5 is a vertical sectional view taken on the broken line 5—5 of Fig. 4.

Referring to Figs. 2 and 4, a power driven rotary shaft 16 is journalled in bearings 17 supported from the base of the machine and has crank discs 18 at opposite ends thereof, each carrying an eccentrically disposed roller 19. Channel bar members 20 have pad portions 21 engaged by the rollers 19 so that on each partial rotation of shaft 16 these members are thrust forwardly. At its front end each bar 20 is suspended from the frame of the machine by a link 22 and, intermediate its ends, each channel bar is pivotally and slidably supported by a roller 23 mounted on a bracket 24 and working in its channel. A transversely extending shaft 25 connects the outer ends of said bars together and at each end is pivotally connected to the lower end of one of the links 22 whose other end is pivoted on a pin 26 mounted in the side frame of the machine. Springs 27, connected to a transversely disposed shaft 28 mounted at its ends in brackets 29a on the bars 20, act to hold said bars against said rollers 19 so that they are reciprocated as shaft 16 turns.

Figure 3:
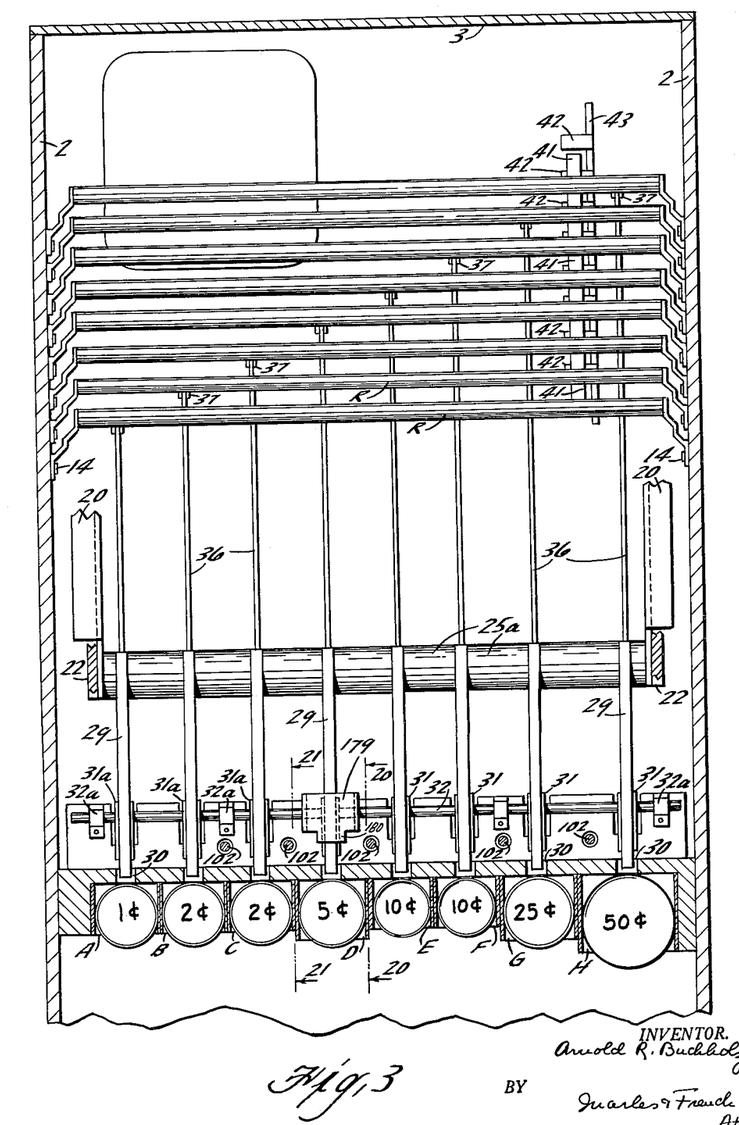
Fig. 3 is a horizontal sectional view taken on the broken line 3—3 of Fig. 2.
Figure 13:
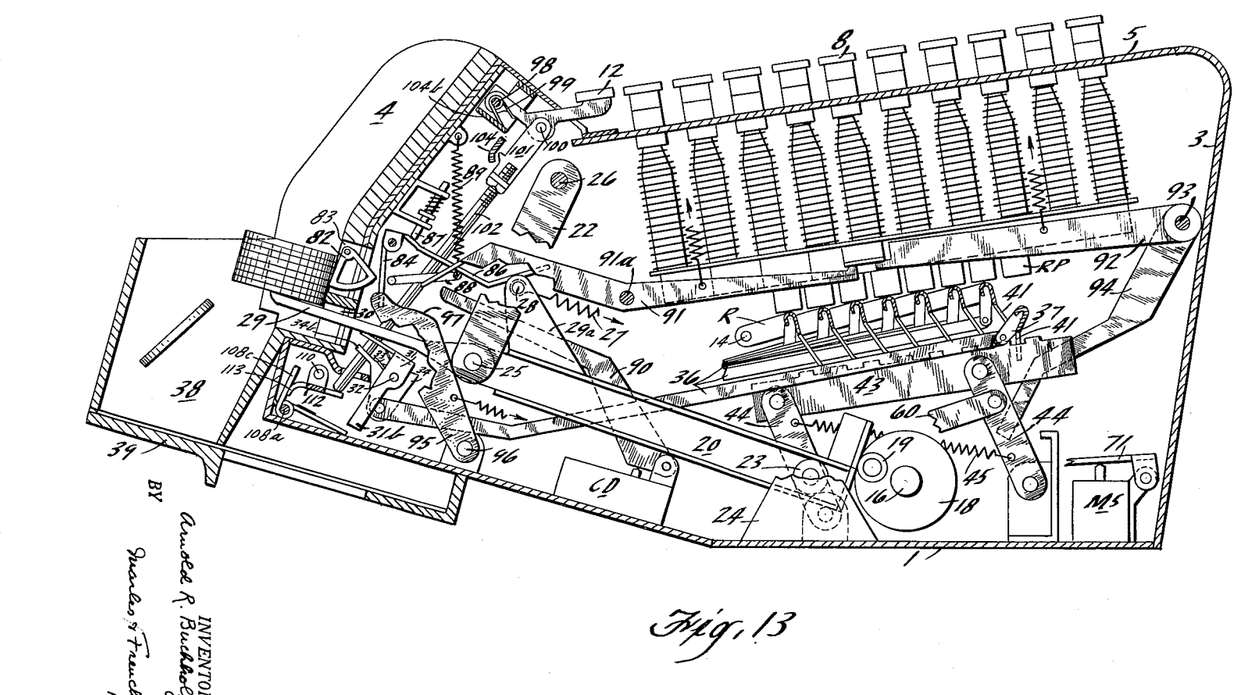
Fig. 13 is a view similar to Fig. 2 showing the parts in a coin ejecting position.

Coin ejector members or fingers 29, one for each coin channel, are pivotally mounted on shaft 25, said fingers working in slots 30 in said channels (see Figs. 2, 3, and 13). Each finger is yieldably supported on the upper side of a lever 31 for the dimes, quarters, and half dollar or a lever 31a for the pennies and nickel pivotally mounted on a fixed pivot shaft 32 supported on brackets 32a and urged upwardly by a spring 33 interposed between said lever 31 or 31a and a lever 34 for the pennies, dimes, quarter, and half dollar or a lever 34a for the nickel. The fingers 29 are spaced apart on the shaft 25 by spacer sleeves 25a. The shaft 32 also has the levers 34 and 34a pivotally mounted thereon, each lever pivotally connected at its outer end by a pin 35 to one end of a link 36 whose other end is pivotally connected to a crank arm 37 on its associated rocker R, the lever 34a being movable relative to its link 36 as hereinafter described. Downward swinging movement of the rocker acts through the link 36 to swing lever 34 or 34a clockwise and thereby swing its arm 34b upwardly to cause spring 33 to swing lever 31 or 31a upwardly to move its associated ejector finger 29 upwardly to bring it into a coin ejector position so that when the bars 20 are thrust forwardly by the rollers 19, the lowermost coin or coins in the associated coin channel will be pushed into a delivery chute 38 whose discharge opening may be controlled by a slidable door 39 normally closed by a spring 40.

Figure 10:
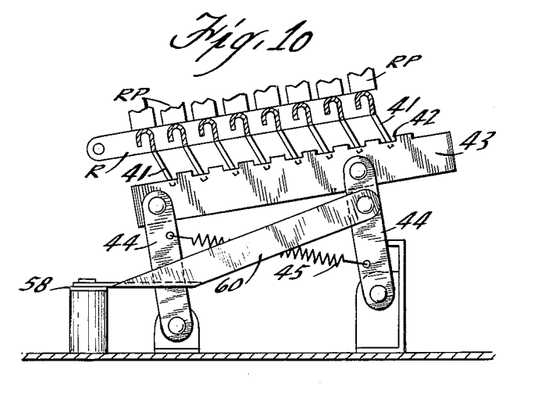
Figs. 10 and 11 are detailed vertical sectional views of parts shown in Fig. 2 showing them in different positions.
Figure 11:
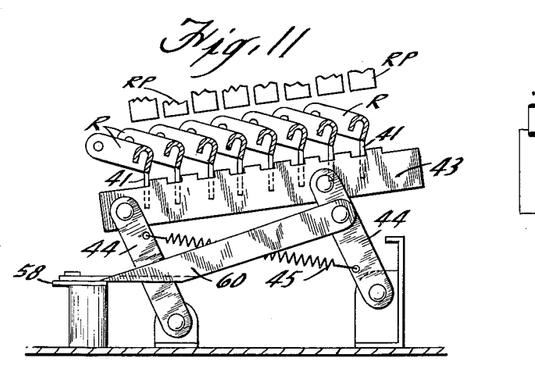

Referring to Figs. 2, 10, and 11, each of the rockers R has a finger portion 41 adapted when said rocker is swung down by the depression of a key to move into position adjacent a shoulder 42 on a rack or toothed bar 43. The bar 43 is mounted on spaced supporting links 44 so as to move generally parallel to the lower ends of the keys, said links being connected together by a spring 45. When on the depression of a key, one or more of the rockers R is or are moved from the position shown in Fig. 2 to the position shown in Fig. 10 and the bar 43 is shifted to the left as indicated in Fig. 11, the fingers 41 will be engaged by the teeth of bar 43 so that the rockers R will be swung clockwise by the movement of bar 43 to shift the links 36 and act through the previously recited connections between said links and ejector fingers 29 to position said fingers in their coin dispensing position.

The shaft 16 may be driven by any suitable electrically operated prime mover. As an example and referring to Fig. 4, I have shown an electric motor M having a reduced speed output shaft 46 carrying a bevel gear 47 meshing with a bevel gear 48 having a hub loose on shaft 16 and provided with a clutch face 49 adapted to be engaged by the clutch face 50 of a clutch sleeve 51 slidably mounted on shaft 16 and slotted at 52 to engage a key pin 53 on said shaft. Sleeve 51 has a collar 54 receiving the forked end of a bell crank lever 55 pivotally supported at 56 and having its other end operatively connected by a link 57 to one arm of a pivotally supported solenoid operated lever 58 normally urged to its inoperative position by a spring 59 and pivotally connected to the forked end of the plunger P of solenoid SC. Plunger P carries a collar PC forming the backing of a cushioning pad CP. The other arm of lever 58 is operatively connected by a link 60 with one of the links 44. Energization of the coil of solenoid SC pulls plunger P inwardly to swing lever 58 and consequently lever 55 to shift clutch sleeve 51 to engage clutch faces 49 and 50 to rotate shaft 16 and at the same time said lever acting through link 60 and links 44 acts to shift the bar 43 to the left to set the ejector fingers 29 in operative position as determined by the positioning of the rockers R relative to said bar 43 by the keys so that as the shaft 16 turns, these set fingers will dispense coins from their associated channels. Instead of a motor and its associated clutch, a rotary type solenoid or a reciprocatory type solenoid having a suitable crank connection with shaft 16 may be used without departing from the invention.

Figure 12:
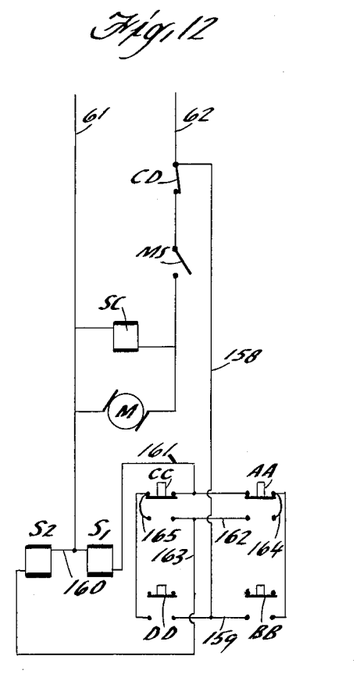
Fig. 12 is a circuit wiring diagram.

Referring to Fig. 12, current supply lines 61 and 62 are connected to the terminals of motor M and the coil of solenoid SC is connected across said lines. One of the lines has a normally closed coin depletion actuated switch CD and a normally open motor switch MS therein.

Figure 7:
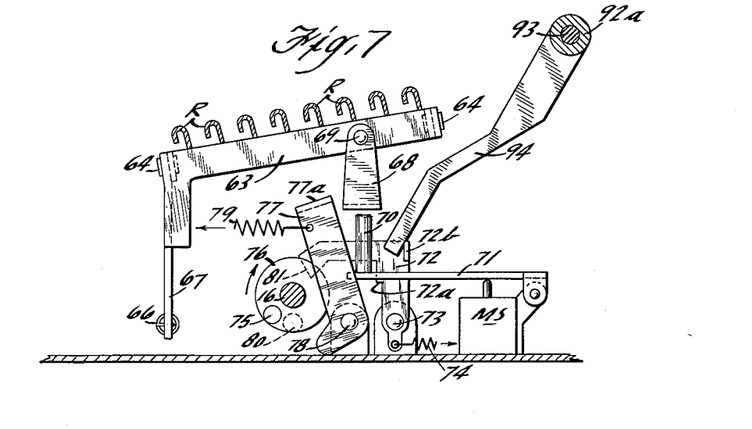
Figs. 7, 8, and 9 are detailed vertical views taken along the line 7—7 of Fig. 4 showing certain of the parts in different positions.

Referring to Figs. 2, 4, 5, and 7, a U-shaped lever 63 is pivotally connected at its ends 64 with suitable bracket arms 65 and is normally urged by a tension spring 66 connected to an arm 67 on said lever into engagement with the lower edges of the rockers R which extend over the top of the transverse portion of said lever. For the sake of clearness, the lever 63 is not shown in Fig. 2 but is shown in Fig. 7. The swinging down of any rocker R by the depression of its associated key acts to swing the lever 63 downwardly about its pivots.

Figure 8:
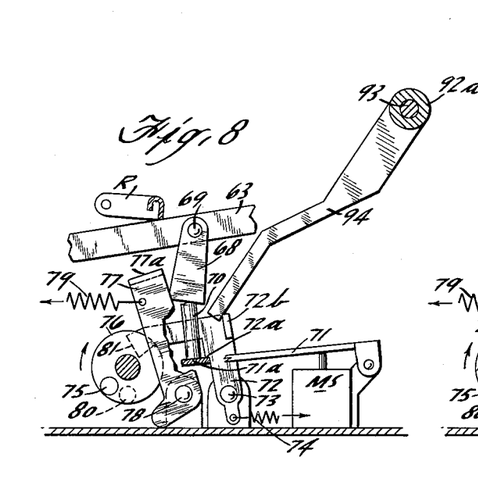
Figure 9:
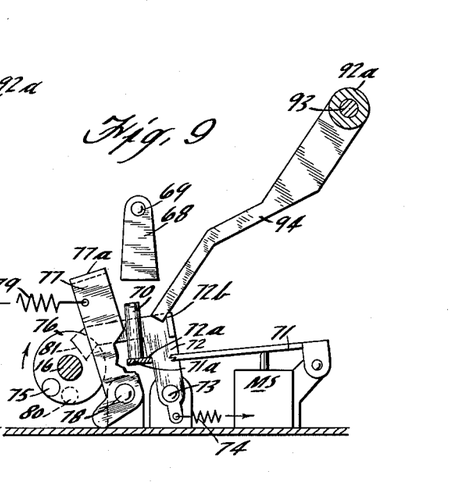

Referring to Figs. 7 to 9, a dog 68 is loosely pivotally mounted on a pin 69 carried in the transverse portion of lever 63 so that on the downward movement of said lever, the dog 68 will engage a post 70 on the actuator arm 71 for the motor switch MS and move this arm to close the motor switch. When this occurs, the arm 71 is held in closed position by a latch 72 pivotally mounted on the frame at 73 and normally urged to a latching position by a spring 74. The cooperative latch surfaces are a shoulder 72a on the latch and a projection 71a on the arm. The latch 72 holds the switch closed until a pin 75 on a collar 76 on shaft 16 moves around to engage a lever 77 pivotally mounted intermediate its ends at 78 on the frame and normally urged to a stop position clear of the dog by a spring 79, said lever having an angled foot 77a engaging the dog 68 to swing it counterclockwise out of the path of the post 70 to permit said arm 71 to move to "off" position on the release of the latch 72. Shortly after this, a pin 80 on the opposite side of collar 76 moves into engagement with a foot 81 of latch 72 as the shaft turns to release the latch 72 from the actuator 71.

Figure 6:
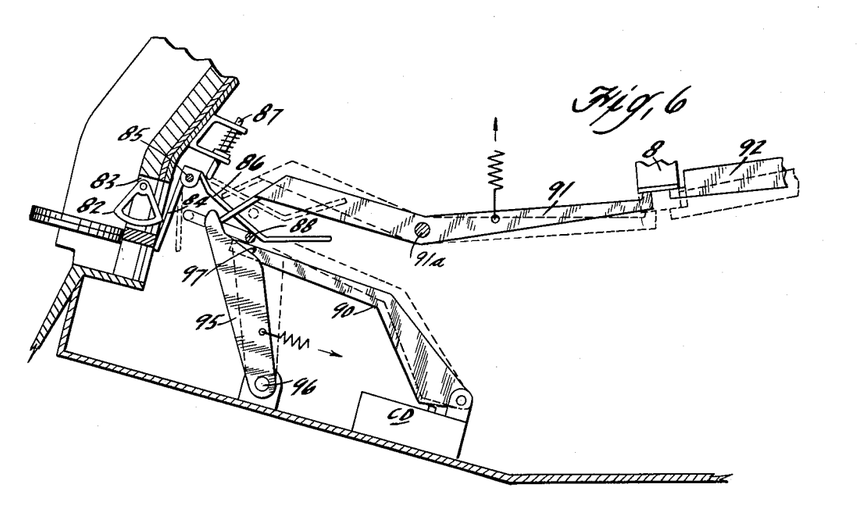
Fig. 6 is a detailed vertical sectional view of parts shown in Fig. 2, showing them in a different position.

In coin handling machines, means are generally provided to prevent further operation of the machine in case the coins in any one of the channels become depleted to such an extent as to need replenishment. Usually, this stops the machine just before the coin channel is exhausted so that the operator by depressing a depletion release key can secure one or more payments before replenishing the depleted channel. For accomplishing this purpose, a coin engaging finger or lever 82 (see Figs. 2 and 6) is pivotally mounted at its upper end to work in a slot 83 in each coin channel. Each finger 82 is yieldingly urged against the stack of coins by one arm of a bell crank lever 84 pivotally mounted on a transversely extending shaft 85 and whose other arm 86 is engaged by a spring pressed pin 87 mounted in guides on the back of the tray support. A U-shaped bar or rod 88 is pivotally mounted in the side frames of the machine and urged upwardly into contact with the arms 86 of the levers 84 by a spring 89. When in the event of a coin depletion any one of the fingers 82 is free to swing inwardly of its coin channel, its associated lever 84 is free to swing clockwise so that its arm 86 engages the transverse portion of bar 88 and swings it downwardly into engagement with a pivoted switch actuator lever 90 and moves this lever to open the switch CD which opens the motor circuit to stop the operation of the machine, as shown in Fig. 6. Under normal operating conditions on each operation of the machine as the ejector operating bars 20 are moved forwardly, the rod 28 carried by said bars moves forwardly or toward the left and engages with extensions of the arms 86 to swing levers 84 counterclockwise against the pressures of their spring pressed pins 87 so that the fingers 82 are relieved of pressure and, therefore, the coins engaged by these fingers can drop down to a position where they can be pushed out of their channels. When as noted above the coins in any one of the channels become depleted and the motor is stopped, another operation of the machine can be had by the operator's first pressing down the depletion or lock release key 8. Depression of key 8 acts to move spring returned levers 91 and 92 shown in Fig. 2. Lever 92 is mounted on a sleeve 92a journalled on a transverse shaft 93 (see Fig. 5) and carrying another lever arm 94 (see Figs. 7 to 9) which, as lever 92 is swung down by the key, swings counterclockwise to engage a projection 72b on motor switch holding latch 72 as shown in Fig. 9 to move this latch to a release position to release motor switch actuator 71 from said latch so that the motor switch MS can open after lever 77 swings dog 68 away from post 57.

Lever 91 is pivotally mounted intermediate its ends on a pin 91a on one side of the machine, and when its key engaging end is swung down, its other end swings up releasing a spring actuated lever 95, normally latched by said lever 91 and pivotally mounted at 96 on the frame of the machine and having a cam or inclined surface 97 which engages the transverse portion of bar 88 and swings said bar upwardly out of engagement with the depletion release switch actuator 90 to allow switch CD to close and so that bar 88 will act to swing the arms 86 of levers 84 upwardly to relieve pressure of these levers on the fingers 82. This establishes a temporary operating relation of the parts of the machine so that on depressing the desired coin dispensing control key the machine will operate once more and will then be stopped by the coin depletion mechanism above described. The ejector fingers 29 are, as previously noted, spaced apart by sleeves 25a and one of these sleeves being in the plane of movement of the lever 95 as the bars 20 and fingers 29 move forwardly during a coin dispensing operation, the upper end of lever 95 is swung toward the left so that it will again be latched in an energizing position with the outer arm of lever 91 before the ejectors move back.

It is to be noted that since the motor M and the coil of solenoid SC are both operated by the closing of the switch MS by the depression of any one of the keys 6 and that this switch MS is latched closed, that once a key is depressed, the machine will go through is dispensing cycle and the depression of any other key during this period will have no effect and will not disturb the position of the rockers R.

From the above description it will be noted that in normal operation, the depression of any one of the keys 6 engages it with one or more of the rockers R and swings such rocker or rockers into engagement with lever 63 to move said lever and dog 68 to move motor switch MS to its closed and latched position and energize solenoid SC at the same time that rockers R are brought into operative association with the toothed bar 43. Solenoid SC then operates lever 58 to throw in the clutch for shaft 16 and also shifts the bar 43 and consequently the rockers R that are down to cause them to act through links 36 to set the desired ejector fingers 29 in coin dispensing position and then as the motor turns shaft 16, the bars 20, rod 25, and fingers 29 are moved toward the left as a unit, and those fingers which are in operative position push the coins from their coin channels into the chute 38. As the shaft 16 continues to revolve and the ejectors move back, the pins 80 and 75 act as previously described to release the latch 72 and move lever 78 to shift dog 68 out of the way of post 70 so that switch actuator 71 can move to inoperative position to stop the motor and, therefore, movement of shaft 16 as the ejectors 29 and bars 20 are returned to their initial position. If a coin depletion occurs, the opening of switch CD opens the motor circuit so that the machine cannot be operated except as noted for one or two times through the operator's operation of the release key 8 before operating a key 6, and then it will be necessary for the operator to replenish the depleted coin channel for further operations. As only a light pressure need be exerted on the keys 6 to effect the initial movement of the rockers R and the closing of switch MS, the operation of the machine is less fatiguing to the operator than of the prior U.S. Patent No. 2,406,948, of September 3, 1946, to Hoffman et al.

The keyboard 5, being set up to take care of tenders of a dollar, if tenders of less than a dollar are to be taken care of, means must be provided to incapacitate certain of the ejectors that would normally dispense coins on a dollar tender basis, and one of the special keys 9 to 13 must first be operated before a change key 6 can be operated.

Referring to Figs. 1, 2, and 15 to 22, each of the keys 9 to 13 is pivotally mounted on a transversely extending shaft 98 and normally urged upwardly by a torsion spring 99 and has a pivoted connection, intermediate its ends, at 100 with the forked end 101 of a push rod structure including a rod 102 slidably mounted and guided at its lower end in a slot 103 in the frame. A transversely extending lock bar 104 has arms 104a pivotally mounted on a bracket 104b and is urged by a spring 105 to swing toward the right, as viewed in Fig. 2, so that when any one of the keys 9 to 13 is depressed, its inclined lower end will swing in to engage a locking shoulder 106 on the push rod structure to hold the rod in a depressed position (see Fig. 15). During each operation of the machine, as the dispensing stroke of the ejectors is completed, one of the arms 22 contacts a screw 107 mounted on an extension arm 108 of the bar 104 and swings said bar to release its latching engagement with the rod structure (see Figs. 15 and 22) to restore the key to its normal position. For incapacitating each of the ejectors for the two ten, quarter and half dollar channels, each of these channels has associated with it a bell crank lever 108c pivoted on a transverse shaft 108a and normally urged to its inoperative position by a spring 109.

Figure 14:
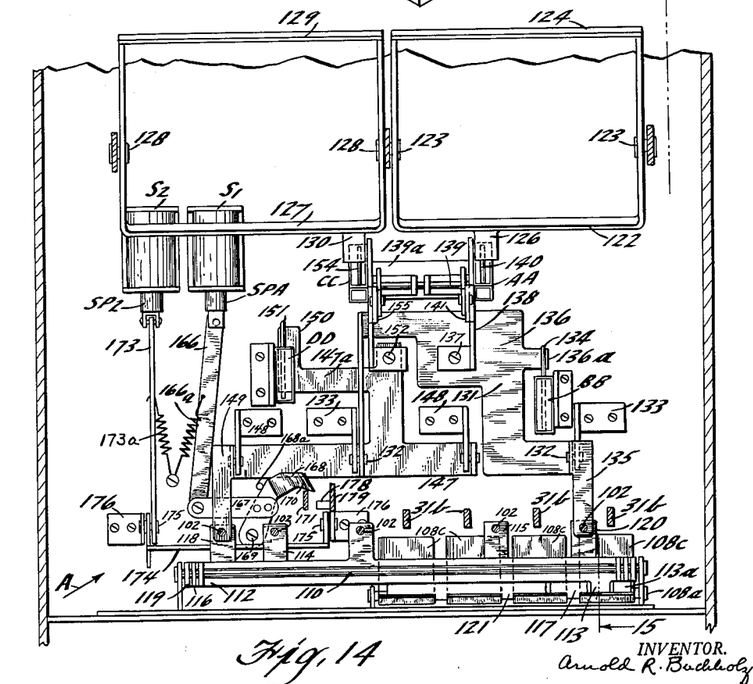
Fig. 14 is a horizontal sectional view taken on the broken line 14—14 of Fig. 15.
Figures 15, 18, 19, 20, 21:
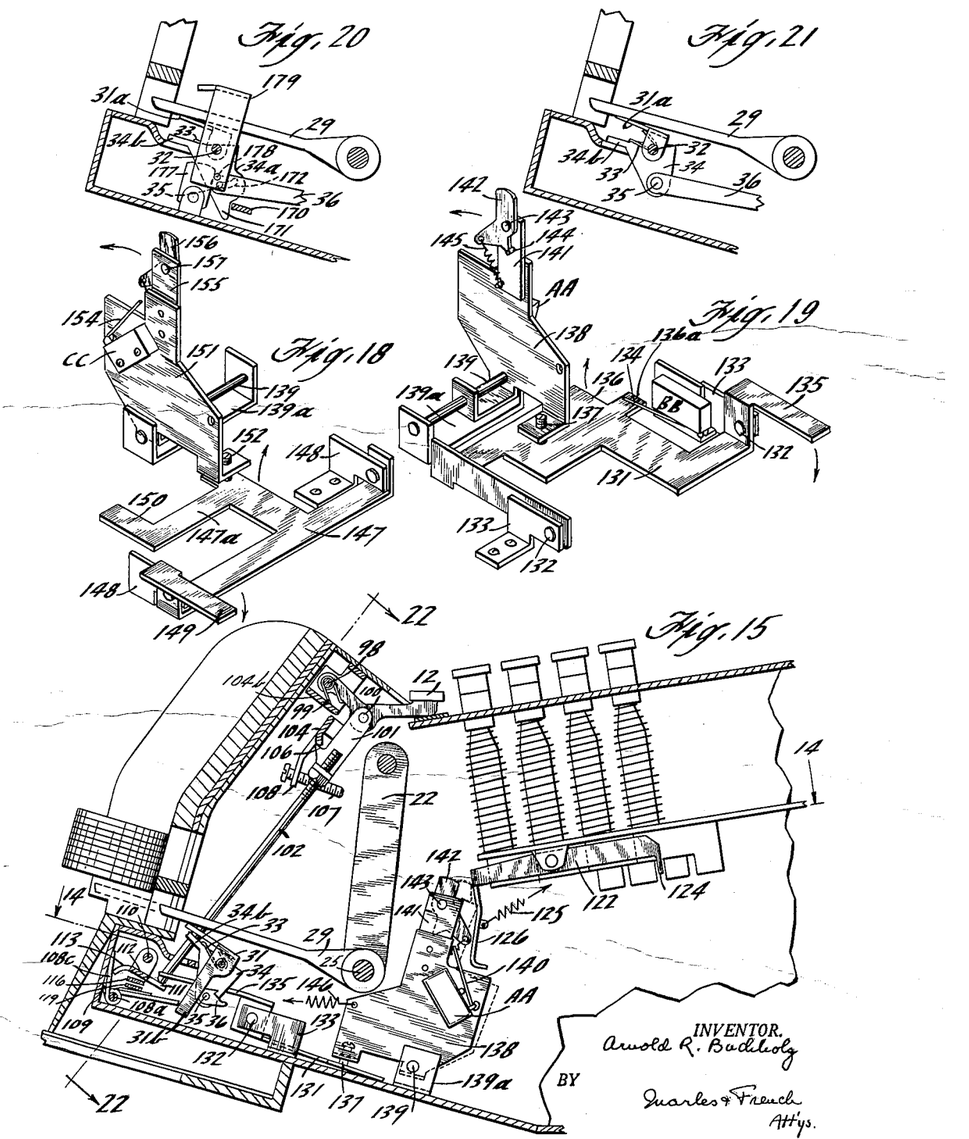
Fig. 15 is a vertical sectional view taken on the broken line 15—15 of Fig. 14.
Fig. 18 is a perspective view looking down in the direction of the arrow A in Fig. 14 of parts relating to the control by the 5 key.
Fig. 19 is a view similar to Fig. 18 of parts relating to the control of the zero key.
Fig. 20 is a detailed vertical sectional view taken on the line 20—20 of Fig. 3.
Fig. 21 is a detailed vertical sectional view taken on the line 21—21 of Fig. 3.
Figure 17:
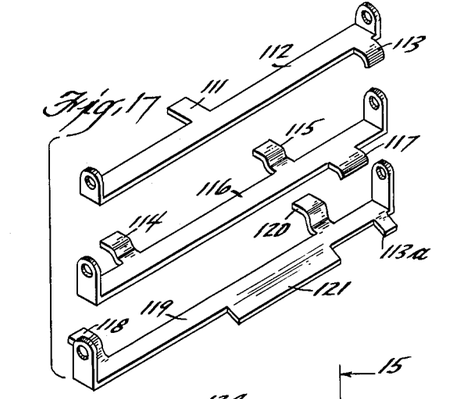
Fig. 17 is an exploded perspective view of the shift bar mechanism.
Figure 22:
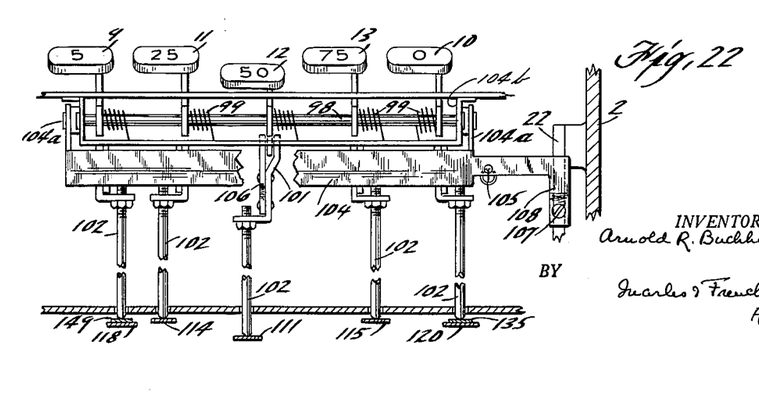
Fig. 22 is a vertical sectional view taken on the broken line 22—22 of Fig. 15 showing the parts associated with the special keys.

Referring to Figs. 14, 17, and 22, the push rod 102 for the key 12 is adapted to engage a projection 111 on a channel bar 112 whose sides are pivoted on a rod 110 mounted in brackets above the bottom 1 of the housing, said bar having a projection 113 for the half dollar channel adapted under the action of said rod to engage one of the arms of its associated bell crank lever 108c whose other arm is then swung up from its position shown in Fig. 2 to that shown in Fig. 15 to engage the extended end 31b of the lever 31 and swing the upper end of this lever downwardly so that the finger 29 will operate in a lower position from that of its position shown in Fig. 13 so that it will clear the coins. Thus depression of key 12 prevents the ejector finger for the half dollar channel from operating to dispense coins from that channel when a tender of fifty cents is given and a depression of one of the keys 6 representing the purchase amount is made.

The push rod 102 for the key 11 and a similar rod for the key 13 are selectively adapted to engage projections 114 and 115 on a channel bar 116 also pivotally mounted on the rod 110, said bar having a projection 117 overlapping the levers 108c for the twenty-five and half dollar channels and adapted under the action of either key operated rod 102 to engage one of the arms of the associated bell crank levers 108c to swing the other arm of said levers into engagement with its associated finger control levers 31 to lower the upper end of levers 31 so that its associated finger 29 will operate in a position below the coins of the twenty-five and half dollar channels. Thus when either the key 11 or 13 is depressed, the ejector fingers for the quarter channel and half dollar channel will be prevented from operating to dispense coins from those channels when a tender of twenty-five or seventy-five cents is given.

The keys 9 and 10 take care of operating the machine to give change for any tender less than a dollar of an amount ending in five or zero, that is, five cents or ten cents, or any multiple of these not including 25, 50, and 75 cents. The push rod 102 of key 9 is adapted to engage a projection 118 on a channel bar 119 also pivotally mounted on the rod 110 and the push rod 102 for key 10 is adapted to engage a projection 120 on bar 119 so that operation of either of these keys will swing the bar 120 and cause projection 121 thereon to respectively engage the bell crank levers 108c for each ten cent channel so that these levers acting on the finger control levers 31 will act as previously described to place the ejector fingers 29 of the associated ten cent channels in a non-dispensing position on the operation of bar 119. Also bar 119 carries a projection 113a which when said bar is operated by either of said keys will act, similar to the projection 113, on the lever 108c for the half dollar channel so that its associated finger control lever 31a will permit the ejector finger 29 for the half dollar channel to assume a non-dispensing position.

In order to make change on the basis of a tender of any amount less than a dollar the keys must be capable of moving the nickel ejector for any amount tendered to and including ninety-five cents. Because of this the usual operation of the nickel ejector for a dollar tender is not sufficient, but the nickel ejector must be capable of operation when any of the regular keys from 1 to 95, inclusive, are depressed though in some instances the nickel ejector is not actually operated. To render the nickel ejector ineffective for operation by the keys 1 to 95, certain of these keys have a finger portion which is adapted to operate on controls now to be described.

Referring to Figs. 14 and 15, there is a rectangular shaped lever 122 pivotally mounted at its opposite sides at 123 on machine frame brackets and having a transverse portion 124 for engagement with keys on the right hand half of the keyboard 1 and normally held in its operating position relative to the keys by a spring 125 connected with a finger extension 126 on lever 122 and a similar rectangular lever 127 pivotally mounted at its opposite sides at 128 on machine frame brackets and having a transverse portion 129 for engagement with keys on the left hand half of the keyboard 1 and spring held, similar to lever 122, in operative association with the keys and provided with a finger extension 130. Levers 122 and 127 are operated each time any of the keys 6 controlling them are depressed, but their effective operation is subject to the positioning of parts controlled by the depression of keys 5 or 0 as hereinafter described.

Referring to Figs. 14, 15, and 19, a plate structure 131 is formed to provide a lever pivoted at 132 on spaced brackets 133 mounted on the base 1 of the housing, one of said brackets carrying a control switch BB having an actuator arm 134. One arm 135 of lever 131 is formed to provide a projection which fits over the top of projection 120 so that the rod 102 for zero key 10 will engage this projection so that both the bar 119 and lever 131 will be operated when said key 10 is depressed. Fig. 15 shows the rod 102 for 50 key 12 and the finger 31 for the half dollar channel but does not show either the rod 102 for the quarter channel or the rod 102 for the key 10, but it does show the arm 135 above described and shown in Fig. 14 is to the rear of finger 31b for the half dollar channel. Operation of lever 131 by key 10 acts to swing arm 135 downwardly and hence the other arm 136 upwardly so that a projection 136a on this arm engages actuator arm 134 of switch BB to shift said switch to its other position and also said arm 136 in swinging acts on a screw 137 on one arm of a plate lever 138 pivotally mounted intermediate its end on a pivot shaft 139 mounted in a bracket 139a carried by the machine base. The other arm of lever 138 has a control switch AA with its actuator 140 mounted on one side of it and on its other side has an extension 141 on which a latch 142 is pivotally mounted at 143 and normally held against a stop 144 by a spring 145. Lever 138 is normally urged to contact engagement of its screw 137 with lever 131 by a spring 146.

Referring to Figs. 14 and 18, a plate lever structure 147, having functions similar to the structure 131, is pivoted on brackets 148 mounted on the base of the machine and one arm 149 is formed to provide a projection which fits over the top of projection 118 (see Fig. 22) so that the rod 102 for the 5 key 9 will engage this projection so that both the bar 119 and lever 147 will be operated when the key 9 is depressed. As in lever structure 131, the other arm 147a of lever 147 has a projection 150 which is adapted to engage the actuator 151 for a control switch DD, not shown in Fig. 18 but shown in Fig. 14, and similar to switch BB of Fig. 19 and similarly operated through said actuator on the upward swing of arm 147a to shift switch DD to its other position when lever 147 is operated by the key 9. As arm 147a swings upwardly, it also acts on one arm of a plate lever 151, similar to lever 138, through the spring pressed engagement of a screw 152 on said arm to swing lever 151, the spring not being shown but similar to the spring 146. Lever 151 is pivotally mounted intermediate its ends on the pivot shaft 139 mounted in a bracket 139a carried by the base 1 of the housing. The other arm of lever 151 has a control switch CC with its actuator 154 mounted on one side of it and on its other side has an extension 155 on which a latch 156 is pivotally mounted at 157 and normally held against a stop by a spring similar to the stop 144 and spring 145 for the latch 142.

Swinging of the levers 131 and 138 by depression of key 10 moves lever 138 from the full line position shown in Fig. 15 to its dotted line position bringing the latch 142 up against the forward edge of the front bar of lever 122 and the finger 126 within striking distance of actuator 140 so that, on depression of any of the keys 6 associated with lever 122, the finger 126 is swung upwardly it will operate actuator 140 to shift switch AA and at the same time permit latch 142 to engage the underside of lever 122 to hold it in its actuated position. Similarly, swinging of levers 147 and 151 by depression of key 9 moves lever 151 to bring its parts into operative association with the lever 127 so that on the depression of any of the keys 6 associated with lever 127 the finger 130 is swung upwardly to operate actuator 154 for switch CC and its latch 156 permitted to engage the underside of lever 127 to hold it in its actuated position. With either of the sets of levers above described in locked position since one of the keys 6 has been depressed the machine goes through its operating cycle to dispense change, and as previously noted as this cycle is completed, the arm 22 engages the screw 107 to release the lock bar 104 so that the rod 102 of the depressed key 9 or 10 is released from its engagement with one or the other of the projections 118 or 120 leaving levers 131 or 147 free to return to their initial position and, therefore, permitting the spring, such as spring 146, to return its associated lever 138 or 151 to its initial position and thereby disengaging the latch 142 or 156 from their associated key controlled lever 122 or 127.

Some of the parts shown in Figs. 14, 15, 18, and 19 have not been shown in other views, where they might occur, for the sake of clearness.

From the above it will be noted that the movement of the levers controlled by key 10 acts to shift the actuator 134 for the switch BB and actuator 140 for the switch AA if called for by a change key, and the movement of generally similar levers controlled by key 9 acts to shift the actuator 151 for switch DD and the actuator 154 for switch CC if called for by a change key.

Referring to Fig. 12, a conductor 158 connects supply conductor 62 with a branch conductor 159 including switches AA, BB, CC, and DD. Conductor 61 extends beyond the motor connection to a branch conductor 160 connected with one of the terminals of the coils or solenoids S1 and S2. The other terminal of solenoid S1 is connected by a conductor 161 with that part of conductor 159 between switches AA and CC. Switches AA and CC when moved to their other positions are adapted to connect with a conductor 162 which between the inner terminal connections for these switches is connected by a conductor 163 with the other terminal of the solenoid S2. There are also jumper connections 164 and 165 between the outer terminal connections of switches AA and CC in their other positions with the conductor 159.

Figure 16:
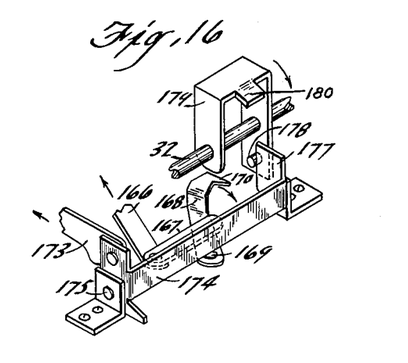
Fig. 16 is a detailed perspective view looking downwardly in the general direction of the arrow A in Fig. 14 showing certain of the parts.

Referring to Figs. 14, 16, and 20, the plunger SPA of solenoid S1 is operatively connected by a link 166 with an arm 167 fixed to the intermediate portion of a lever 168 pivotally mounted at one end on a pivot 169 and having an outer end 170 for engaging a shoulder 171 on the lever 34a associated with the nickel ejector and similar to the lever 34 previously described except for said projection and an arcuate slot 172 adapted to receive the pin 35 on its shift link 36. Lever 34a is pivotally mounted on the shaft 32 that carries the other levers 34 and also the ejector raising finger 31a with its spring 33. Plunger SPA is returned by a spring 166a which also acts to hold lever 168 in its inoperative position against a stop pin 68a. Under normal operation the link 36 operates the levers 31a and 34a to dispense a nickel. Also when solenoid S1 is energized to swing end 170 against shoulder 171 and swing the lower end of lever 34a to the left as viewed in Fig. 20 and thereby through levers 34a and 37 raise the nickel dispensing finger to a dispensing position independently of the link 36 so that a nickel will be dispensed from this channel if the solenoid S1 is energized.

The plunger SP2 of solenoid S2 is operatively connected by a link 173 to one arm of a U-shaped lever 174 pivotally mounted at its ends at 175 to spaced brackets 176 and provided with another arm 177 adapted to engage a pin 178 on the lower end of one leg of a U-shaped throw out lever 179 whose legs are pivotally mounted on the shaft 32 and whose transverse portion carries a finger 180 adapted to engage the nickel ejector finger 129 to incapacitate said finger, when said levers 174 and 179 are moved by the plunger SP2 in the direction of the arrow indicated in Fig. 16 if the solenoid S2 is energized. Plunger SP2 is returned by a spring 173a.

Thus depending upon whether the solenoid S1 or S2 will be energized, a nickel will be or will not be dispensed from the nickel channel, but depression of either key 9 or 10 normally requires the dispensing of a nickel since switch BB will be operated on operating key 10 and switch DD will be operated on operating key 9.

Referring to Fig. 12, when key 10 is depressed and lever 131 is operated, switch BB will be shifted to its closed position so that current can flow via conductors 62, 158, 159, closed switches BB and AA to conductor 161, coil of solenoid S1, conductor 160 to return line 61 to energize said solenoid and shift lever 34a to a nickel dispensing position, and when key 9 is depressed and lever 147 is operated, switch DD will be shifted to its closed position so that current can flow via conductors 62, 158, 159, closed switches DD and CC to conductor 161, coil of solenoid S1 to return line 61 to energize said solenoid and shift lever 34a to a nickel dispensing position.

Whether or not a nickel will be dispensed depends upon whether the change key 6 requires or does not require a nickel. If it does not, then the operation of the lever 122 after the key 10 is operated will shift switch AA or the operation of lever 127 after key 9 is operated will shift switch CC. If switch AA is shifted through the control of the change key to its other position, then with switch BB closed by the depression of key 10, current can flow via conductors 62, 158, 159, closed switch BB, jumper 164, shifted switch AA, conductors 162 and 163, coil of solenoid S2, conductor 160 to return line 61 to energize said solenoid and through lever 179 prevent nickel finger 29 from operating. If switch CC is shifted through the control of the change key to its other position, then with switch DD closed by the depression of key 9, current will flow via conductors 62, 158, 159, closed switch DD, jumper 165, shifted switch CC, conductors 162 and 163, coil of solenoid S2, conductor 160 to return line 61 to energize said solenoid and through lever 179 prevent nickel finger 29 from operating.

There is no restriction placed on the dispensing of pennies from the penny channels, and because of this, their finger lifting levers 31 do not have a depending projection such as that provided for fingers 31a for the dimes, quarter, and half dollar channels, and this same form of lever is used for the nickel channel (see Figs. 21 and 20).

As examples of the method of operation of the above described machine, assume the purchase price of an article to be 65¢. On a dollar tender for this article, it is only necessary for the operator to press downwardly on the 65 key 6, and this will act through its projections RP to move the desired rockers R to operative association with the bar 43 and close the motor switch MS and energize solenoid SC to engage the clutch 49, 50 and shift bar 43 to operate the desired links 36 and their associated finger lifting means so that on the dispensing cycle, the ejectors 29 for the channels F and G will be operated to eject a dime and quarter, respectively. If now the tender for this 65¢ article is 75¢, then the operator first presses down on the special key 13. This operation incapacitates the ejectors for channels H and G and the ejector for channel E is operative as before to eject a dime when the 65 key 6 is depressed. If the tender is 70¢, which is a number ending in zero or one of the multiples of ten, the operator first depresses zero key 10, thus incapacitating the ejectors for channels H, F, G, and E and at the same time shifting lever 131 to shift switch BB to its other position and energize solenoid S1 to shift lever 34a as above described to raise ejector finger 29 for the nickel channel to a dispensing position, and then when the 65 key 6 is depressed, a nickel in change is delivered, it being noted that the 65 key 6 for the dollar tender does not have an element to cause the shifting of the link 36 for the nickel channel.

Assuming the purchase price to be 32¢ and the tender a dollar, pressing down on the 32 key 6 sets the machine to operate the ejectors for the penny channel A, the two penny channel C, the nickel channel D (through the setting by its associated link 36) the first 10¢ channel E and the 50¢ channel H to deliver 68¢ in change to the purchaser on the operation of motor M. Now if the tender is 50¢ for this purchase, the operator first presses down on the 50 key 12, thus incapacitating the fifty cent ejector and then on depressing the 32 key 6 the ejectors for channels A, C, D, and E, one penny, two penny, 5¢, and 10¢, respectively, are operated by the motor dispensing the 18¢ change. In this case also the nickel ejector operates through the setting of its finger by its associated link 36. If for the 32¢ purchase 40¢ is tendered, then the zero key 10 is first depressed, incapacitating the ejectors of the chutes E, F, G, and H and at the same time shifting lever 131 to shift switch BB to its other position and energize solenoid S1 to shift lever 34a as above described to raise ejector finger 29 for the nickel channel to a dispensing position, and then when the 32 key 6 is depressed, a nickel in change is delivered, it being noted that the 32 key 6 does not operate on lever 122 which might effect this operation, but it does have projections which operate the rockers for setting up the ejectors for the penny channels A and C so that on the operation of the motor 8¢ in change will be delivered. If for the same purchase price the amount tendered is 35¢, then the 5 key 9 is depressed which incapacitates the channels E, F, G, and H and at the same time acts to shift levers 147 and 151 to a position where switch DD is closed and the finger 130 for lever 127 is brought into position adjacent the actuator 154 for switch CC so that when the 32 key 6 is depressed, its projection will operate lever 127 as above described to move finger 130 to operate actuator 154 for switch CC to shift it to its other position so that solenoid S2 is energized to move lever 179 to shift nickel ejector finger 29 to an inoperative position so that as the machine makes its dispensing cycle, the ejectors for channels A and C which have been set by the operation of the 32 key 6, will be operated by the motor to dispense three cents in change.

It is to be noted that claims to any common subject matter are included in my prior copending application Serial No. 688,163, filed October 5, 1957, as a continuation in part of my prior application Serial No. 581,581, filed April 30, 1956, now abandoned, for Coin Delivery Machine.

It is also to be noted that instead of the two keys 11 and 13 a single key could be used since both keys perform the same function of operating bar 119 and are used because of the psychological effect on the operator.

I desire it to be understood that this invention is not to be limited to any particular form or arrangement of parts except insofar as such limitations are included in the claims.

What I claim as my invention is:

1. In a coin changing machine comprising a keyboard having a plurality of change keys numbered from 1 to 99, coin channels for pennies, nickels, dimes, quarters and half dollars, a reciprocatory power operated ejector mechanism having an ejector finger associated with each coin channel and capable of movement to an operative position, power operated means selectively controlled by said change keys for setting ejector fingers in an operative position by which change from said channels can be effected on a dollar basis, the combination with a pair of solenoids, means operated by one of said solenoids for positioning the ejector finger for the nickel channel in its operative position, independently of the positioning of said selectively controlled power operated means, for operating on tenders of less than a dollar in connection with change keys 1 to 95, means operated by the other of said solenoids for moving the ejector finger for the nickel channel to an inoperative position for certain change requirements, special keys including a zero key and a five key, and control means for said solenoids including an electrical circuit, control switches in said circuit for said solenoids, means operable by either said zero or five key for operating certain of said switches in making change on a tender of less than a dollar other than tenders of twenty-five, fifty and seventy-five cents for energizing the said first named of said solenoids, and means thereafter operable by certain of said change keys to operate others of said control switches to energize the other of said solenoids to satisfy the change requirements of said certain keys.

2. In a coin changing machine comprising a keyboard having change keys numbered 1 to 99, coin channels for pennies, nickels, dimes, quarters and half dollars, a reciprocatory power operated ejector mechanism having an ejector finger associated with each coin channel and capable of movement to an operative position, power operated means selectively controlled by said change keys for setting ejector fingers in an operative position by which change from said channels can be effected on a dollar basis, the combination with an electrical circuit including a pair of solenoids and two pairs of control switches, means operated by one of said solenoids on a closure of one of the switches of one pair of switches for positioning the ejector finger for the nickel channel in its operative position, independently of the positioning of said selectively controlled power operated means, for operating on tenders of less than a dollar in connection with change keys 1 to 95, means operated by the other of said solenoids on the shift of one of the switches of the other pair of switches for moving the ejector finger to an inoperative position for certain change requirements, a special zero key, a special five key, means operable by either of said last named keys to move one of said switches of said first named pair of switches to energize the first referred to one of said solenoids, and means thereafter operable by certain of said change keys and as a consequence of the operation of one of said special keys to move one of said switches of the second named pair of switches to energize the other of said solenoids and deenergize the first named of said solenoids to satisfy the change requirements of said certain keys.

3. In a coin changing machine having change keys and a nickel channel and ejector mechanism including an ejector finger for said channel capable of movement to an operative position, means controlled by said change keys for setting said ejector finger in a position to eject a nickel when operating the machine on a dollar tender basis, the combination with additional key controlled means for setting said ejector finger in a position to eject a nickel when operating the machine on a tender of less than a dollar other than a tender of twenty-five, fifty, and seventy-five cents including a solenoid and an ejector positioning control lever operated thereby, special 0 and 5 keys, a control circuit for said solenoid including a switch, a lever controlled by each of said special keys, a lever operated by one of said special key controlled levers and adapted to operate said control switch to energize said solenoid, a second control switch in said circuit, a lever operated by certain of said change keys to actuate said second control switch when the lever operated by one of said special key controlled levers is operated to deenergize said solenoid, a second solenoid in said circuit energized by the operation of said second switch, means operated by said second solenoid to prevent ejection of a nickel when said certain of said change keys are operated, and means controlled by said change keys for operating said ejector mechanism.

4. In a coin changing machine comprising a keyboard having change keys numbered 1 to 99, coin channels for pennies, nickels, dimes, quarters and half dollars, there being a single nickel channel, a reciprocatory power operated ejector mechanism having an ejector finger for each coin channel and capable of movement from an inoperative to an operative position, power operated means selectively controlled by said change keys for setting ejector fingers in an operative position by which change from said channels can be effected on a dollar basis, the combination with additional keys, means for locking any of said additional keys in a depressed condition, means operated by said power operated ejector mechanism for releasing said locking means after change has been dispensed, means controlled by said additional keys for setting the nickel finger ejector in position to eject a nickel when operating the machine on a tender of less than a dollar other than a tender of twenty-five, fifty, and seventy-five cents, means, rendered operative by said last named means, for control by certain of the change keys for overcoming said setting of said nickel ejector finger to prevent ejection of a nickel when such change keys are operated including a latching means, means operable on the depression of certain of said additional keys for setting said latching means in a latched position, and means operable on the release of said locking means for the additional keys to release the means for setting said latching means in a latched position and thereby permit the release of said latching means.

References Cited in the file of this patent

UNITED STATES PATENTS

| | | |
|---|---|---|
| 1,356,379 | McDermott | Oct. 19, 1920 |
| 1,745,737 | Camp | Feb. 4, 1930 |
| 2,406,948 | Hoffman et al. | Sept. 3, 1946 |
| 2,675,006 | Buchholz | Apr. 13, 1954 |